United States Patent
Ozveren

Patent Number: 5,546,377
Date of Patent: Aug. 13, 1996

[54] EFFICIENT DISTRIBUTED METHOD FOR COMPUTING MAX-MIN FAIR RATES OF A LIMITED RESOURCE IN ATM NETWORKS

[75] Inventor: Cuneyt M. Ozveren, Somerville, Mass.

[73] Assignee: Digital Equipment Corporation, Maynard, Mass.

[21] Appl. No.: 558,566

[22] Filed: Oct. 31, 1995

[51] Int. Cl.⁶ .............................. H04L 12/56; H04L 12/02
[52] U.S. Cl. .............................. 370/13; 370/60; 370/60.1; 370/94.1; 370/94.2
[58] Field of Search .............................. 370/13, 17, 94.1, 370/94.2, 94.3, 60, 60.1, 58.1, 58.2, 58.3

[56] References Cited

U.S. PATENT DOCUMENTS

| | | | |
|---|---|---|---|
| 5,029,164 | 7/1991 | Goldstein et al. | 370/95.1 |
| 5,313,454 | 5/1994 | Bustini et al. | 370/13 |
| 5,367,523 | 11/1994 | Chang et al. | 370/84 |
| 5,457,687 | 10/1995 | Newman | 370/13 |

Primary Examiner—Douglas W. Olms
Assistant Examiner—Ajit Patel
Attorney, Agent, or Firm—Kenneth F. Kozik

[57] ABSTRACT

The distributed computation of max-min fair rates in general require lookups for all connections. This present method includes a distributed process for computing max-min fair rates in response to a rate allocation request by any connection. The method computes the optimal rate by performing a single lookup of the state for a particular connection. The discrepancies due to omitting the lookup for other connections are corrected when those connections request a rate allocation.

6 Claims, 4 Drawing Sheets

EFFICIENT DISTRIBUTED METHOD FOR COMPUTING MAX-MIN FAIR RATES OF A LIMITED RESOURCE IN ATM NETWORKS

FIELD OF THE INVENTION

This invention relates to data communications, and more particularly to congestion avoidance in networks.

BACKGROUND OF THE INVENTION

In any computer communications network, one may find a large number of source nodes vying for a limited number of resources in order to transfer data to a number of destination nodes. Typically, messages are sent from a source node via a communications line to one or more switches in a network, and then forwarded to a destination node. In addition, destination nodes will respond to message received from source nodes via a communication line, and this communication results in feedback from the destination node to the source node. As can be appreciated, when any number of source nodes begin transmitting data toward a network comprised of one or more network connections that may be described generally as network resources, each of these nodes would like to obtain the greatest amount of throughput possible in order to get the data transferred through the network resource to the respective destination nodes. Thus, the situation occurs that a number of nodes vie for the same network resource. When this occurs, a situation called "bottleneck" may occur. Bottleneck can be described generally as a condition that occurs in a network resource when all of the bandwidth within the network resource is used up by the competing source nodes trying to transfer data through it.

Various methods to control congestion at various network resources within a network are known. For example, a node wishing to send data to a network resource captures a channel to that network resource, sends data to that network resource, which subsequently transfers that data from the network resource to a destination node. In turn, the destination node may return an acknowledgment, sometimes referred to as an ACK, to the source node. In this method, the message being transferred to the network resource may carry a flag, which when a bottleneck situation is discovered in the network resource, the network resource in turn sets this flag (or bit) on the incoming message, and routes it to the destination node. The destination node, upon checking the bit or flag, finds the bit set and returns a message through the network resource back to the source node that originated the message, indicating that the source node should slow down sending messages.

Another method that is well known in the art is known as rate based congestion control. As is well known, this scheme requires a distributed computation of fair rate allocations of the total bandwidth for each network resource in the network. The generally accepted fairness metric for this method is known as max-min fair rates. With this method, the network looks at the worst bottleneck within the network, i.e., the network resource with the largest number flows passing through. Once this network resource is discovered, the rate of flows through the network resource are adjusted, and the method continues by removing that network resource from the network and then looking at the next worst bottleneck network resource. This process is continually repeated until there are no bottlenecks found.

In the so-called "end-to-end" scheme, a source node will send a rate request in an information cell to a network resource, that network resource will look at the rate request and decide which rate is appropriate to give for that connection. The network source then includes that rate in the resource cells going back to the source, and the source adjusts its throughput accordingly. As is well known with this method, the problem is how should the network resource allocate bandwidths to each flow. As is currently known, rate allocation of bandwidth is done on a "per outgoing network resource" basis.

What is desired is a method that works locally on a network resource, such as an asynchronous transfer mode (ATM) switch, to determine a specific rate allocation. With such a method, a specific rate allocation would be requested by each virtual circuit (VC), and the maximum fair rate that can be allocated for that VC by that network resource would be computed. This method would result in a computed allocation of bandwidth that is always less than or equal to the requested rate.

SUMMARY OF THE INVENTION

A method for computing fair rates in a computer network is provided including the steps of providing a plurality of source nodes, providing a plurality of destination notes, providing a plurality of switches to connect each one of the plurality of source nodes to each one of the plurality of destination nodes, selecting a first switch, the first switch having an associated allocated bandwidth, selecting a first source node, the first source node establishing a first connection to the first switch, selecting a first destination node, the first destination node establishing a second connection to the first switch, sending a plurality of data cells from the first source node via the first connection to the first switch, one of the data cells being a forward resource management cell containing a forward rate request value, reading the forward rate request value, computing a computed fair rate request value from the forward rate request value, sending a plurality of data cells from the first destination via the second connection to the first switch, one of the data cells being a reverse resource management cell having a reverse rate request value, reading the reverse rate request value, comparing the computed rate request value and the reverse rate request value, inserting the computed rate request value into the reverse resource management cell if the computed rate request value is less than the reverse rate request value, and adjusting a rate at which the plurality of cells are sent from the first source node acceding to the rate request value in the reverse resource management cell.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments, which follow, when read in conjunction with accompanying drawings, wherein:

DESCRIPTION OF THE PREFERRED EMBODIMENT(S)

Figure 1:
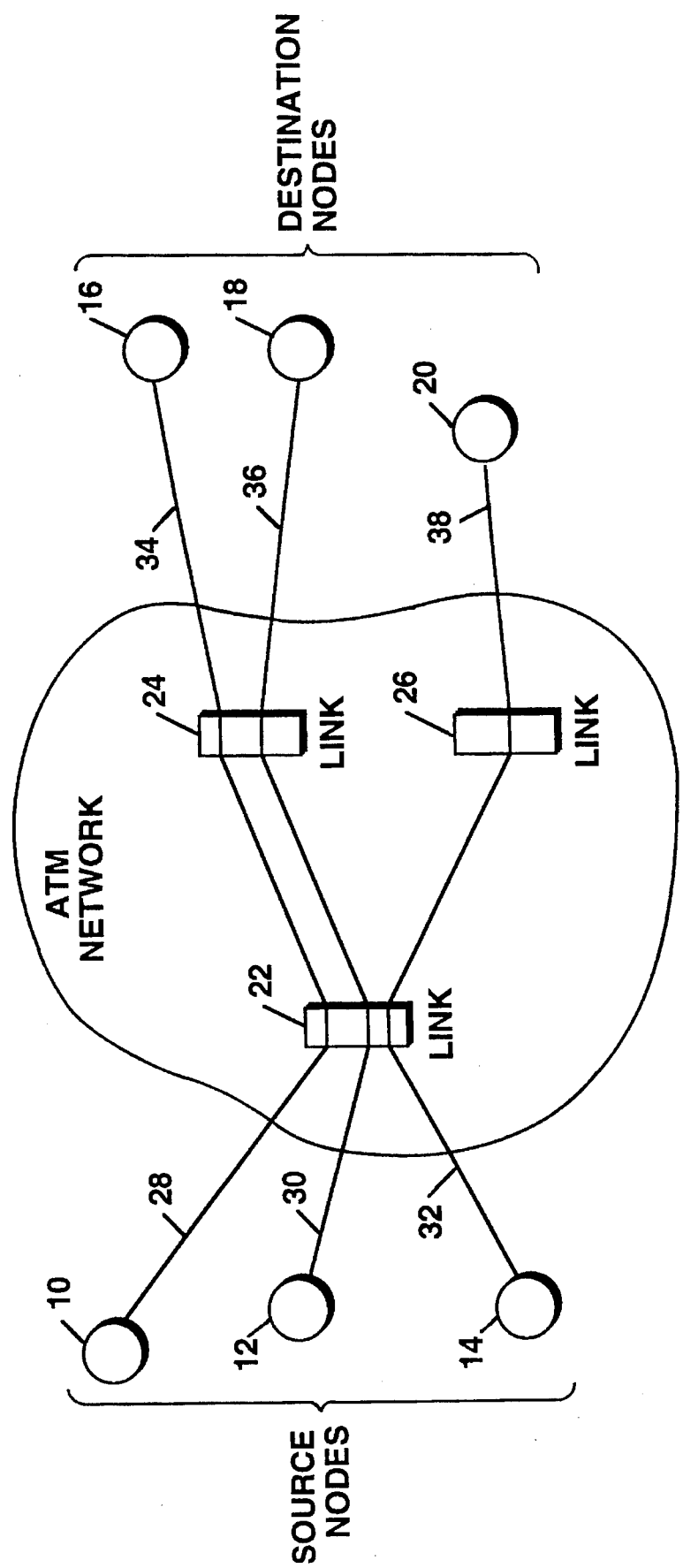
FIG. 1 is a block diagram of an exemplary computer network in which the present invention may be used.

Referring to FIG. 1, an exemplary asynchronous transfer mode (ATM) network is shown to include seven nodes labeled as 10, 12, 14, 16, 18, 20, and 22, respectively. Nodes 10, 12, 14, and 16, may generally be referred to as source nodes, while nodes 18, 20, and 22 may generally be referred to as destination nodes. However, in actual operation, any one node in the exemplary network of FIG. I may send data to any one or more of the other nodes in the exemplary network. The exemplary network of FIG. I is also shown to include three network resources referred to switch 24, switch 26, and switch 28. The exemplary network also shows a link 30 and a link 32.

By way of example, a connection has been established between nodes 10 and 18, respectively. This connection consists of link 34, switch 26, link 32, and link 36. Each connection between a source node and a destination node is as referred as a virtual circuit (VC).

As mentioned above, the exemplary VC contains the link 32. Generally, a link provides communication between two switches. Specifically, link 32 provides communication between switch 26 and switch 28, while link 30 provides communication between switch 24 and 26.

As can be seen in FIG. 1, link 32 is a primary bottleneck in the exemplary network, while link 30 is a secondary bottleneck in the exemplary network.

An exemplary communication from source node 10 to destination node 18 may occur in the following manner. Node 10 establishes a VC to node 18. The source node 10 begins sending data in the form of cells of information on line 34 to switch 26. For ease of discussion, this flow of cells from source node 10 is referred to as the forward direction. One of these cells is referred to as a resource management cell or RM cell and contains a rate request. The rate request in the RM cell is what source node 10 would like for bandwidth through the switch 26. If a congestion condition exists in switch 26, the switch 26 fills in the rate request that it can accommodate for the VC in an RM cell traveling in the reverse direction, i.e., traveling to source node 10. This returning RM cell will be read by node 10 and inform it that congestion has occurred somewhere in the network and that source node 10 should decrease the flow rate at which it is sending cells on the VC to node 18 to the rate specified in the RM cell.

Figure 2:
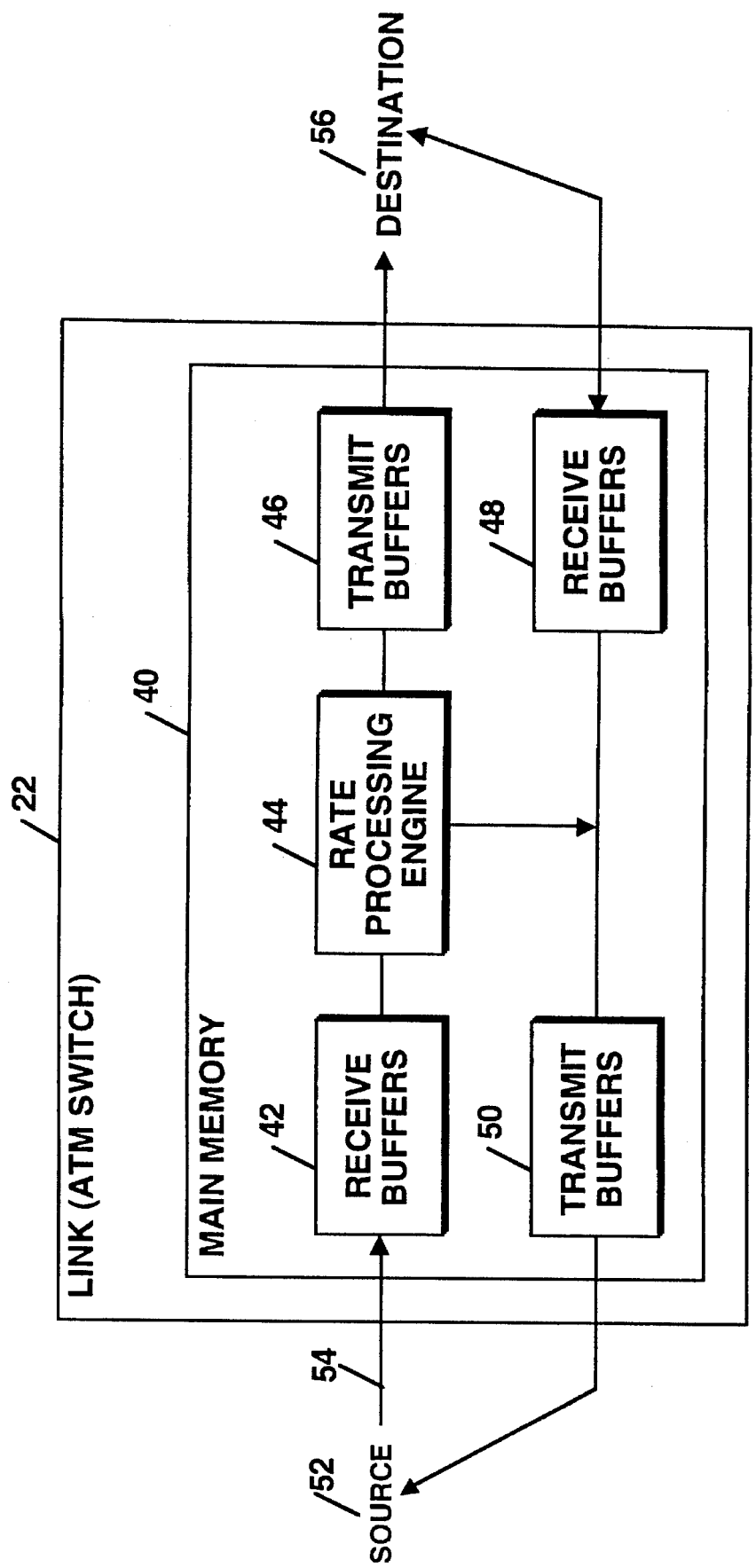
FIG. 2 is a block diagram of one of the switches of FIG. 1.

The mechanism just described in which a source node 10 sends information through a network to a destination node 18 and the destination node 18 sends feedback information to the source node 10 is known generally as a rate based congestion control scheme. Referring now to FIG. 2, the switch 26 is shown in greater detail. The switch 26 is shown to include a receive buffers 40, a rate processing engine 42, a transmit buffers 44, a receive buffers 46, and a transmit buffers 48. In an typical fashion, cells are sent from node 10 to receive buffers 40. In rate processing engine 42, any RM cells are read. Other cells continue to transmit buffers 44, and then on to node 18. Node 18 also sends cells toward switch 26; these cells from node 18 arrive in the receive buffers 46. The cells then flow through the rate processing engine 42 and enter transmit buffers 48. From there, the cells flow to node 10. The cells sent from node 18 to node 10 also contain RM cells. All cells from the node 18 to the node 10 are generally referred as flowing in the reverse direction. The RM cells flowing in the reverse direction are read by the rate processing engine 42, and then injected back into the flow of cells toward the node 10.

Figure 3:
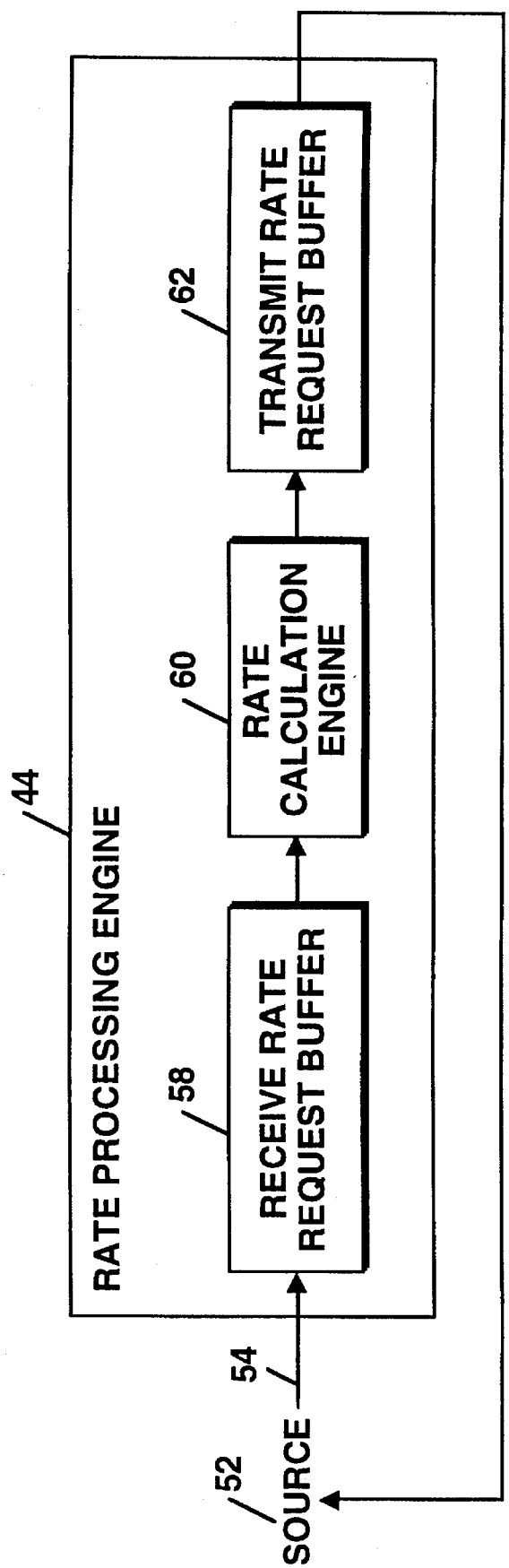
FIG. 3 is a block diagram of the rate processing engine of the switch shown in FIG. 2.

Referring now to FIG. 3, the rate processing engine 42 of FIG. 2 is shown in greater detail. Cells flowing in the forward direction 50 contain RM cells. The rate processing engine 42 reads the rate request contained an RM cell flowing in the forward direction and submits it to the process engine 52. The process engine adjusts the rate request according to principles to be fully described with reference to FIG. 4. Once the process engine calculates a rate, the rate processing engine reads a rate request from a RM cell flowing in the reverse direction 54, compare the actual rate to the calculated rate, and injects the calculated rate back into the RM cell flowing in the reverse direction if the requested rate found in the RM cell flowing in the reverse direction is equal to or greater than the calculated rate.

Figure 4:
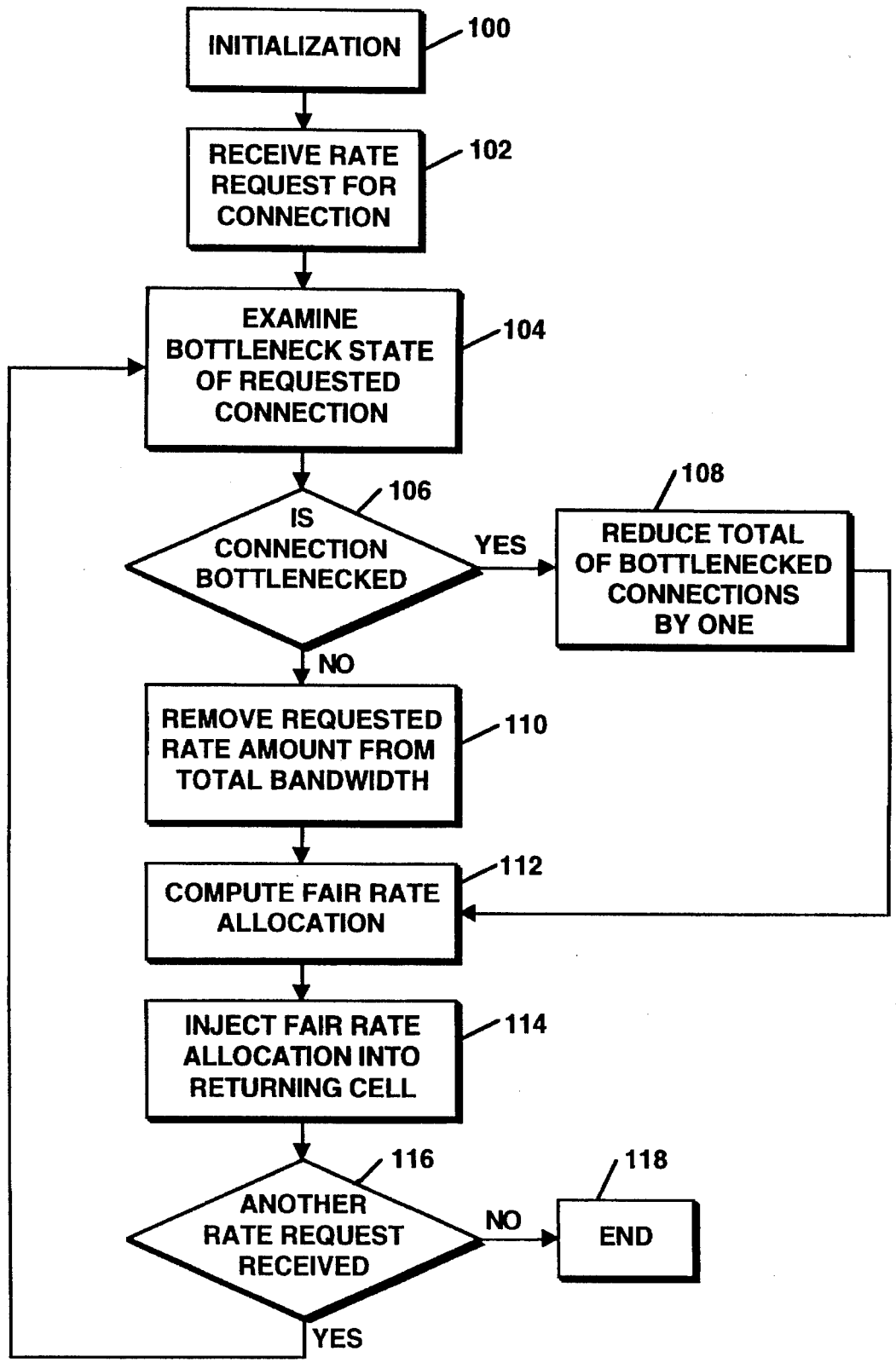
FIG. 4 is a flow chart illustrating the invention as it resides in the rate processing engine of FIG. 3.

Referring now to FIG. 4, the rate processing engine 42, calculates a max-min fair rate for the switch 26 in the indicated steps. At step 100, the rate processing engine performs a four part initialization. First, the max-min fair rate allocated for the particular connection based on the requested allocation rate is set to zero. Next, the bottleneck status of the connection is set to zero. Third, the number of connections bottleneck at the switch 26 is set equal to zero. Lastly, the total bandwidth allocated to non-bottleneck connections is set to zero. At step 102, a RM cell is received in a forward direction. If no RM cell is received, the method waits until there is a RM cell received. At step 104, the RM cell, with its rate request is read by the rate processing engine. At step 106, the bottleneck connection of the requested connection is checked. At step 108, the rate processing engine 42 determines whether the connection is bottlenecked or not. If the connection is bottlenecked, the rate processing engine proceeds to step 110 where the total number of bottleneck connections is reduced by one. If at step 108 the connection is not bottlenecked, at step 112 the rate processing engine removes the requested rate amount from the total bandwidth available at the switch 26. At step 114, a fair rate allocation is computed First, a connection is said to be bottlenecked if the requested rate is greater than or equal to the quantity "link capacity minus the total bandwidth allocated to non-bottlenecked connections, divided by the number of connections bottlenecked at this link plus one." If the connection is not bottlenecked, the max-min fair rate allocated for the connection based on the requested allocation is set equal to the requested allocation. If the connection was determined to be bottlenecked, the max-min fair rate allocation for the connection based on the requested rate is set equal to the link capacity minus the total bandwidth allocated to non-bottlenecked connections, divided by the number of connections bottlenecked at the link plus one. Now that the fair rate allocation has been computed at step 114, the computed fair rate allocation is injected into a RM cell proceeding in the reverse direction at step 116. The process then cycles back to step 100.

Thus, the method shown in FIG. 4 computes the optimal rate by performing a single lookup of the state for the particular connection. The discrepancies due to omitting the lookup for other connections are corrected when those connections request a rate allocation.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method for computing fair rates in a computer network comprising the steps of:

providing a plurality of source nodes;

providing a plurality of destination nodes;

providing a plurality of switches to connect each one of the plurality of source nodes to each one of the plurality of destination nodes;

selecting a first switch, the first switch having an associated allocated bandwidth;

selecting a first source node, the first source node establishing a first connection to the first switch;

selecting a first destination node, the first destination node establishing a second connection to the first switch;

sending a plurality of data cells from the first source node via the first connection to the first switch, one of the data cells being a forward resource management cell containing a forward rate request value;

reading the forward rate request value;

computing a computed fair rate request value from the forward rate request value;

sending a plurality of data cells from the first destination via the second connection to the first switch, one of the data cells being a reverse resource management cell having a reverse rate request value;

reading the reverse rate request value;

comparing the computed rate request value and the reverse rate request value;

inserting the computed rate request value into the reverse resource management cell if the computed rate request value is less than the reverse rate request value; and adjusting a rate at which said plurality of cells are sent from said first source node acceding to the rate request value in the reverse resource management cell.

2. The method for computing fair rates in a computer network according to claim 1 wherein the step of computing the computed fair rate value in the first switch comprises the steps of:

initializing a set of system dependent variables;

determining whether a bottleneck condition state exists in the first switch;

adjusting the bottleneck condition state in response to the step of determining;

computing a fair allocation in response to the step of determining; and setting the computed fare rate value to the fair allocation.

3. The method for computing fair rates in a computer network according to claim 2 wherein the step of initializing the set of system dependent variables comprises the steps of:

setting the fair rate value to zero;

setting the bottleneck condition state for the first switch to zero;

setting a number representing a number of bottlenecked connections at the first switch to zero; and setting a number of non-bottlenecked connections to zero.

4. The method for computing fair rates in a computer network according to claim 2 wherein the step adjusting the bottleneck condition state in response to the step of determining comprises the step of resetting the bottleneck connection state.

5. The method of computing fare rates in a computer network according to claim 4 wherein the step of resetting the bottleneck state comprises the steps of:

setting the allocated bandwidth to the allocated bandwidth minus the rate request if the bottleneck state equals zero; and setting the number of connections bottlenecked at the first switch to the number of connections bottlenecked at the first switch minus one if the bottleneck state equals one.

6. The method of computing fair rates in a computer network according to claim 5 wherein the step of computing the computed fare rate further comprises the steps of:

setting the computed fair rate to the requested rate and allocated bandwidth to the allocated bandwidth plus the fair rate if the bottleneck condition state is zero;

setting the computer fair rate to the quotient of link capacity of the first switch minus the total bandwidth allocated to non-bottlenecked connections and the number of bottlenecked connections plus one if the bottleneck connection state is zero; and setting the number of connections bottlenecked at the first switch to the number of connections bottlenecked plus one.

\* \* \* \* \*